US011931675B2

(12) United States Patent
Grange et al.

(10) Patent No.: US 11,931,675 B2
(45) Date of Patent: Mar. 19, 2024

(54) FILTER ELEMENT, LIQUID FILTERING DEVICE COMPRISING SUCH A FILTER ELEMENT AND VEHICLE COMPRISING SUCH A LIQUID FILTERING DEVICE

(71) Applicant: VOLVO TRUCK CORPORATION, Gothenburg (SE)

(72) Inventors: Thomas Grange, Lyons (FR); François Giroud, Lyons (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 522 days.

(21) Appl. No.: 16/973,840

(22) PCT Filed: Jun. 22, 2018

(86) PCT No.: PCT/EP2018/066815
§ 371 (c)(1),
(2) Date: Dec. 10, 2020

(87) PCT Pub. No.: WO2019/242866
PCT Pub. Date: Dec. 26, 2019

(65) Prior Publication Data
US 2021/0113943 A1  Apr. 22, 2021

(51) Int. Cl.
*B01D 29/21*  (2006.01)
*B01D 29/58*  (2006.01)
(Continued)

(52) U.S. Cl.
CPC ........... *B01D 29/21* (2013.01); *B01D 35/153* (2013.01); *B01D 29/58* (2013.01); *B01D 35/16* (2013.01); *B01D 35/30* (2013.01); *B01D 2201/295* (2013.01); *B01D 2201/34* (2013.01); *B01D 2201/4076* (2013.01)

(58) Field of Classification Search
CPC . B01D 35/153; B01D 35/16; B01D 2201/295
See application file for complete search history.

(56) References Cited

U.S. PATENT DOCUMENTS

2008/0142426 A1*  6/2008  Greco ................. B01D 35/147
                                                210/234
2012/0267293 A1* 10/2012  Ardes ................. B01D 35/147
                                                210/418
(Continued)

FOREIGN PATENT DOCUMENTS

WO    2013162570 A1    10/2013
WO    2017050369 A1     3/2017

OTHER PUBLICATIONS

International Search Report and Written Opinion dated Mar. 20, 2019 in corresponding International PCT Application No. PCT/EP2018/066815, 9 pages.

*Primary Examiner* — Benjamin M Kurtz
(74) *Attorney, Agent, or Firm* — Venable LLP; Jeffri A. Kaminski

(57) ABSTRACT

This filter element (1) comprises a filter medium (3) configured with an annular shape, having a central axis (X1) and forming inside a central channel (4) extending substantially axially, a first and a second end plates (5, 6), each plate covering one axial end of the filter medium (3) and being sealingly mounted on said axial end, the first end plate (5) having a central opening (7) substantially coaxial with the central axis (X1) and in fluid communication with the channel (4), and a central perforated rigid tube (9) that extends axially between the first and second end plates (5, 6) and having an inner perforated wall delimiting the central channel (4). The filter element (1) is designed to be placed in a filter housing (14) for forming a liquid filtering device (10), whereby a liquid to be filtered can flow along a liquid path through the filter medium (3) towards the channel (4) and out of the filter element (1) through the central opening (7). The central perforated rigid tube (9) comprises at least one guiding path (24), arranged inside the central perforated rigid tube (9), adapted to generate, by contact with a (Continued)

following member (204) of a rotatable central element (200) of the filter housing (14), at least a first, progressive rotational movement (A5) of the rotatable element (200) of the filter housing (14) when the filter element (1) is mounted in the filter housing (14) during a first translation movement (A1) along the central axis (X1). The at least one guiding path (24) comprises at least one portion of helical path (24A) for obtaining the first, progressive rotational movement (A5), and the helical path (24A) extends on less than half of the inner periphery of the central perforated rigid tube (9) in order to generate a rotation of the rotatable element (200) inferior to one half of a turn.

34 Claims, 9 Drawing Sheets

(51) Int. Cl.
  *B01D 35/153* (2006.01)
  *B01D 35/16* (2006.01)
  *B01D 35/30* (2006.01)

(56) References Cited

U.S. PATENT DOCUMENTS

| | | |
|---|---|---|
| 2013/0228503 A1 | 9/2013 | Baumann et al. |
| 2019/0060802 A1* | 2/2019 | Grange ................. B01D 29/96 |
| 2019/0329164 A1* | 10/2019 | Mincher ................ B01D 29/15 |

* cited by examiner

FILTER ELEMENT, LIQUID FILTERING DEVICE COMPRISING SUCH A FILTER ELEMENT AND VEHICLE COMPRISING SUCH A LIQUID FILTERING DEVICE

CROSS-REFERENCE TO RELATED APPLICATIONS

This application is a U.S. National Stage application of PCT/EP2018/066815, filed Jun. 22, 2018, and published on Dec. 26, 2019, as WO 2019/242866 A1, all of which is hereby incorporated by reference in its entirety.

TECHNICAL FIELD

The invention relates to a filter element, in particular for filtering a liquid in a vehicle such as fuel or oil. The invention also relates to a liquid filtering device comprising such a filter element, and to a vehicle comprising such a liquid filtering device.

The invention can be applied in passenger car vehicles or in heavy-duty vehicles, such as trucks, buses and construction equipment.

BACKGROUND

Liquid filters are commonly provided in vehicles to remove contaminants from said liquid, which can be fuel or oil for example.

A conventional filter element may comprise a filter medium forming an axial channel, the axial ends of said filter medium being covered by end plates sealingly mounted on said axial ends. Furthermore, one end plate includes a central opening substantially coaxial and in fluid communication with the channel. Such a filter element is housed in a casing comprising a filter housing and a filter cover, the casing comprising an inlet port and an outlet port for the liquid, one of said ports being in fluid communication with said central opening.

Thus, a liquid to be filtered can flow inside the casing by the inlet, through the filter medium, and then the filtered liquid can exit the filter element by the central opening and, ultimately, can exit the casing by the outlet.

Because the filter medium progressively gets clogged, the filter element needs to be periodically changed so that it remains effective. To that end, the filter cover is removed from the filter housing, the old filter element is removed, and a new filter element is inserted in the filter housing before the filter cover is closed again.

During filter servicing, when the filter is removed, the clean side of the filter housing has to be kept clean. As it is located downstream the filter, all particles that can drop in the center tube of the filter housing, where is located the outlet for the filtered fluid, will never be stopped.

These particles can lead to injectors wear or seizure in case of fuel filters and can lead to wear or seizure of bearings and roller cam in case of oil filters.

This is why a system preventing such issue is needed.

SUMMARY

An object of the invention is to provide a technical solution which ensures an efficient protection against entry of external particles and contamination in the clean side of the housing during servicing.

The object is achieved by a filter element comprising:
a filter medium configured with an annular shape, having a central axis and forming inside a central channel extending substantially axially;
a first and a second end plates, each plate covering one axial end of the filter medium and being sealingly mounted on said axial end, the first end plate having a central opening substantially coaxial with the central axis and in fluid communication with the channel; and
a central perforated rigid tube that extends axially between the first and second end plates and having an inner perforated wall delimiting the central channel,
the filter element is designed to be placed in a filter housing for forming a liquid filtering device, whereby a liquid to be filtered can flow along a liquid path through the filter medium towards the channel and out of the filter element through the central opening,
the central perforated rigid tube comprises at least one guiding path, arranged inside the central perforated rigid tube, adapted to generate, by contact with a following member of a rotatable central element of the filter housing, at least a first, progressive rotational movement of the rotatable element of the filter housing when the filter element is mounted in the filter housing during a first translation movement along the central axis,
the at least one guiding path comprises at least one portion of helical path for obtaining the first, progressive rotational movement, and the helical path extends on less than half of the inner periphery of the central perforated rigid tube in order to generate a rotation of the rotatable element inferior to one half of a turn.

Thanks to the invention, the outlet of the filtered liquid is automatically closed during removal of the filter element, preventing entry of exterior contaminants during the time when no filter element is present in the filter housing.

According to further aspects of the invention which are advantageous but not compulsory, such a filter element may incorporate one or several of the following features:
The helical path extends on less than a quarter of the inner periphery of the central perforated rigid tube in order to generate a rotation of the rotatable element inferior to one quarter of a turn.
The helical path has an inclination angle comprised between 5° and 45° with respect to the central axis of the filter element.
The guiding path is adapted to generate, when the filter element is dismounted from the filter housing during a second translation movement along the central axis in the opposite direction with respect to the first movement, a second rotational movement of the rotatable element, in the opposite direction with respect to the progressive rotational movement, this second rotational movement occurring at the beginning of the second translation movement.
The guiding path comprises an insertion section, which comprises the helical path, and a dismounting section, which comprises a portion with an angle of inclination that, when measured with respect to the central axis of the filter element, is greater than the angle of inclination of the helical path of the insertion section, preferably said portion of the dismounting section extends substantially perpendicular to the central axis for generating the second rotational movement.
The guiding path comprises a rest portion provided between the insertion section and the dismounting section.

The portion extending substantially perpendicular to the central axis is prolonged by a surface parallel to the central axis and angularly shifted in the circumferential direction with respect to the rest portion, and the portion extending substantially perpendicular to the central axis and the surface parallel to the central axis form together a L general shape.

The rest portion is, on the inside periphery of the central perforated rigid tube, angularly shifted in the circumferential direction with respect to the end of the helical path.

The guiding path comprises a straight entry section preceding the helical path.

The guiding path comprises an exit section which forms the end of the dismounting section and which is, on the inside periphery of the central perforated rigid tube, angularly shifted in the circumferential direction with respect to the entry section.

The guiding path is formed by a groove provided on an inner surface of the central perforated rigid tube.

The guiding path is provided in two symmetric paths diametrically opposed with respect to the central axis.

The invention also concerns a liquid filtering device comprising:
- a filter element, comprising:
  - a filter medium configured with an annular shape, having a central axis and forming inside a central channel extending substantially axially;
  - a first and a second end plates, each plate covering one axial end of the filter medium and being sealingly mounted on said axial end, the first end plate having a central opening substantially coaxial with the central axis and in fluid communication with the channel; and
  - a central perforated rigid tube that extends axially between the first and second end plates and having an inner perforated wall delimiting the central channel,
- the central perforated rigid tube comprises at least one guiding path, arranged inside the central perforated rigid tube, adapted to generate, by contact with a following member of a rotatable element of the filter housing, at least a first, progressive rotational movement of the rotatable element of the filter housing when the filter element is mounted in the filter housing during a first translation movement along the central axis,
- at least one guiding path comprises at least one portion of helical path for obtaining the first, progressive rotational movement,
- the liquid filtering device also comprises a filter housing receiving the filter element, and including a bottom wall, a peripheral wall, a main opening at its axial end opposite the bottom wall, and an axial member which is configured to be inserted in the filter element channel, the axial member forming an inner outlet channel, the axial member comprising at least one liquid outlet opening allowing liquid to flow from the channel of the filter element towards the inner outlet channel of the axial member.

This liquid filtering device is characterized in that:
- the axial member comprises a rotatable portion forming the rotatable element, and a stationary portion,
- the stationary portion comprises the liquid outlet opening, and the rotatable portion comprises a first opening adapted to align with the liquid outlet opening, and adapted to close the liquid outlet opening,
- the rotatable portion comprises at least one protruding element, forming the following member, adapted to be received in the guiding path of the filter element when the filter element is mounted in the filter housing,
- in a first position of the filter element, the rotatable portion is positioned with respect to the stationary portion so that the liquid outlet opening is closed,
- in a second position of the filter element, the rotatable portion is positioned with respect to the stationary portion so that the liquid outlet opening is open.

According to further aspects of the invention which are advantageous but not compulsory, such a liquid filtering device may incorporate one or several of the following features:

The filter housing comprises a draining channel and a liquid draining opening in fluid communication with the draining channel, and the rotatable portion comprises a second opening adapted to align with the liquid draining opening, and adapted to close the draining opening, and in the first position of the filter element, the draining opening is open and in the second position of the filter element, the draining opening is closed.

The liquid outlet opening and the draining opening are axially shifted from each other.

The first and second openings of the rotatable portion are axially shifted from each other.

The liquid outlet opening and the draining opening are angularly shifted from each other.

The first and second openings of the rotatable portion are angularly aligned.

The first and second openings of the rotatable portion are angularly shifted from each other, and the liquid outlet opening and the draining opening are angularly aligned.

The draining opening is provided in the bottom wall.

The draining channel is provided within the axial member, and the inner outlet channel and the draining channel are arranged concentrically around the central axis of the axial member.

The draining channel is provided within the axial member, and the inner outlet channel and the draining channel are arranged parallel to the central axis of the axial member and opposed with respect to the central axis of the axial member.

The filter housing comprises a resilient means urging the rotatable portion in rotation around the central axis of the axial member with respect to the stationary portion and maintaining the at least one protruding element in contact with an active surface of the guiding path of the filter element.

At the beginning of the removal of the filter element, the resilient means urges the rotatable portion towards the first position.

The passage of the rotatable portion from its second position to its first position at the beginning of the removal of the filter element is obtained with a translation of the filter element of up to 50% of the length of the filter element taken along its central axis.

The resilient means are formed by a spring arranged in a space between the rotatable portion and the stationary portion and exerting a rotation torque on the rotatable portion.

The at least one protruding element is formed by two nipples radially protruding from an outer cylindrical surface of the rotatable portion.

The liquid outlet opening is a radial opening.

The first opening is a radial opening.

In the first position of the filter element, the filter element is removed from the filter housing, while in the second position of the filter element, the filter element is completely inserted in the filter housing.

The liquid filtering device comprises a filter cover to which the filter element is attached, the filter element is attached to the filter cover with a possibility of rotation between them, and the filter element is inserted in the filter housing without possibility of rotation of the filter element with respect to the filter housing thanks to an anti-rotation device that cooperates with an anti-rotation device formed in the filter housing.

The anti-rotation device of the filter element is formed by at least one finger extending radially from the first end plate that cooperates with at least one axial groove or rib extending along the height of the peripheral wall.

The invention also concerns a vehicle comprising a liquid filtering device as mentioned here-above.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
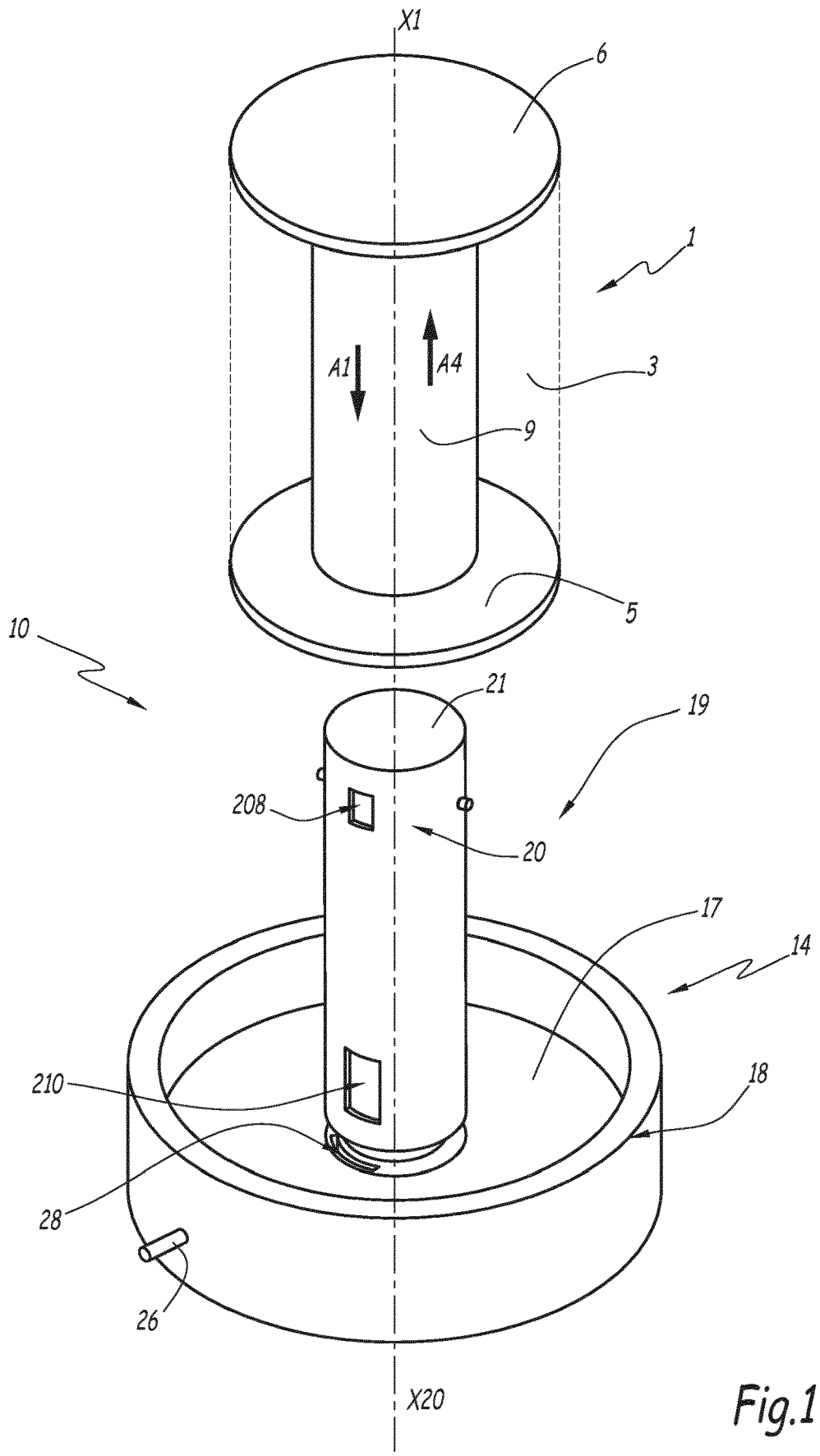
FIG. 1 schematically shows in exploded view of a filter element and a filter housing for forming a liquid filtering device.

As illustrated in FIG. 1, a filter element 1, having a central axis X1, comprises a filter medium 3 annularly shaped around a central perforated rigid tube 9. The central perforated rigid tube 9 radially supports the filter medium to prevent the filter medium 3 from flattening due to pressure of the liquid flowing through it.

The filter element 1 further comprises a first and a second end plates 5, 6, each end plate covering one axial end of the filter medium 3 and being sealingly mounted on said axial end. The first end plate 5 has a central opening 7 (FIGS. 4 and 5) substantially coaxial and in fluid communication with the channel 4.

The central perforated rigid tube 9 forms an inside channel 4 extending axially between the first and second end plates 5 and 6. The filter medium 3 can be made of a sheet of cellulosic material folded so as to have, in cross section, the shape of a star having a plurality of branches.

In this description, the terms "axial" or "radial", "axially" or "radially" refer to the central axis X1, or to other axes that are aligned with the axis X1. The "circumferential direction" corresponds to a direction running around the central axis X1.

The filter element 1 is designed to be placed substantially coaxially in a filter housing 14, for forming a liquid filtering device 10. Such a liquid filtering device 10 can be implemented in a vehicle, to filter a liquid such as fuel or oil. The filter housing 14 also includes a filter cover 40 shown on FIGS. 9 and 10 that can be conventionally screwed on the main opening of the filter housing 14. The filter element 1 is attached to the filter cover 40. For instance, the filter element 1 is clipped on the filter cover 40 via flexible fingers 61 extending axially from the top and second end plate 6 to cooperate radially with an annular groove 41 formed on the outside periphery of an axial extension 42 of the filter cover 40.

As illustrated in FIGS. 1, 2 3, 8 and 9, the filter housing 14, which is generally cylindrical, comprises a bottom wall 17, that can form or be also part of a filter module base, a peripheral wall 18, and an open axial end 19 (shown in FIG. 9) opposite the bottom wall 17. The peripheral wall 18 is represented only partially on FIGS. 1 to 3 for the sake of clarity, and in total on FIGS. 9 and 10. The filter housing 14 comprises a liquid inlet channel 50, a liquid outlet channel 23 and a drain channel 26. These channels 50, 23 and 26 are generally extending through the bottom wall 17 of the filter housing.

The filter housing 14 further comprises an axial member 20 extending along an axis X20 which is configured to be inserted in the filter element channel 4 via said central opening 7. The axial member 20 extends from the bottom wall 17 up to its free end 21 over an axial distance that advantageously slightly lower than the axial height of the peripheral wall 18. The axial member 20 may be a tube or rigid core, and generally comprises at least one liquid outlet opening 22, formed by a radial hole, arranged in its peripheral wall preferably near the free end 21. The axial member 20 forms a tube that protrudes from the bottom wall 17, and forms an inner outlet channel 23 in fluid communication with the liquid outlet opening 22.

The filter element 1 is designed to be mounted in the filter housing 14, with the channel 4 receiving the axial member 20, the axes X1 and X20 being superimposed. In use, a liquid to be filtered—such as fuel or oil—flows the filter medium 3, from the outside of the filter medium 3 towards the channel 4, and then out of the filter element 1 through the axial member 20, and ultimately out of the liquid filtering device 10. As the end plates 5, 6 are sealingly mounted on the filter medium 3, the inside and the outside of the filter medium 3 are not in fluid communication, except through the filter medium 3.

When the filter medium 3 has become clogged, the filter element 1 is removed from the filter housing 14, and a new filter element 1 is inserted in the filter housing 14.

The central perforated rigid tube 9 comprises at least one guiding path 24, represented on FIGS. 4, 5, 9, 10, arranged inside the central perforated rigid tube 9, adapted to generate, by contact with a following member of a rotatable element of the filter housing 14, at least a first, progressive rotational movement of the rotatable element of the filter housing when the filter element 1 is mounted in the filter housing 14 during a first translation movement along the central axis X1.

The axial member 20 comprises a rotatable portion 200, forming said rotatable element, and a stationary portion 202. The rotatable portion 200 rotates with respect to the stationary portion 202 around the axis X20. The rotatable portion 200 and the stationary portion 202 are coaxial around the axis X20. In operating order of the filter module, the rotatable portion 200 is engaged in the central perforated rigid tube 9 of the filter element. The rotatable portion 200 and the central perforated rigid tube 9 are designed to keep a radial clearance forming an annular space between them to allow liquid to flow between the rotatable portion 200 and the central perforated rigid tube 9.

The rotatable portion 200 comprises at least one radial protruding element, forming the following member, adapted to be received in the guiding path 24 when the filter element 1 is mounted in the filter housing 14.

In an embodiment, the at least one protruding element is formed by two nipples 204 radially protruding from an outer cylindrical surface 206 of the rotatable portion 200. The nipples 204 cooperate by sliding contact with the guiding path 24 so that during insertion of the filter element 1 on the axial member 20, the guiding path 24 provokes rotations of the nipples 204 around the axis X20, due to the fact that the filter element 1 is inserted without possibility of rotation with respect to the filter housing 14 while the rotatable portion 200 is free to rotate with respect to the stationary portion 202.

The guiding path 24 comprises at least one portion of helical path 24A for obtaining the first, progressive rotational movement. In other words, during insertion of the filter element 1, a progressive rotation of the rotatable portion 200 occurs, due to the cooperation of the nipples 204 sliding along the helical path 24A.

In an embodiment, the helical path 24A extends on less than half of the inner periphery of the central perforated rigid tube 9 in order to generate a rotation of the rotatable element 200 inferior to one half of a turn. Preferably, the helical path 24A extends on less than a quarter of the inner periphery of the central perforated rigid tube 9 in order to generate a rotation of the rotatable portion 200 inferior to one quarter of a turn. In an embodiment, the helical path 24A has an inclination angle α comprised between 5° and 45° with respect to the central axis X1.

The stationary portion 202 comprises the liquid outlet opening 22 and the inner outlet channel 23, and the rotatable portion 200 comprises a first opening 208 adapted to align with the liquid outlet opening 22. The wall of the rotatable portion 200 closes the liquid outlet opening 22 when the first opening 208 is not aligned with the liquid outlet opening 22. The opening 208 is located near the free end 21.

Figure 2:
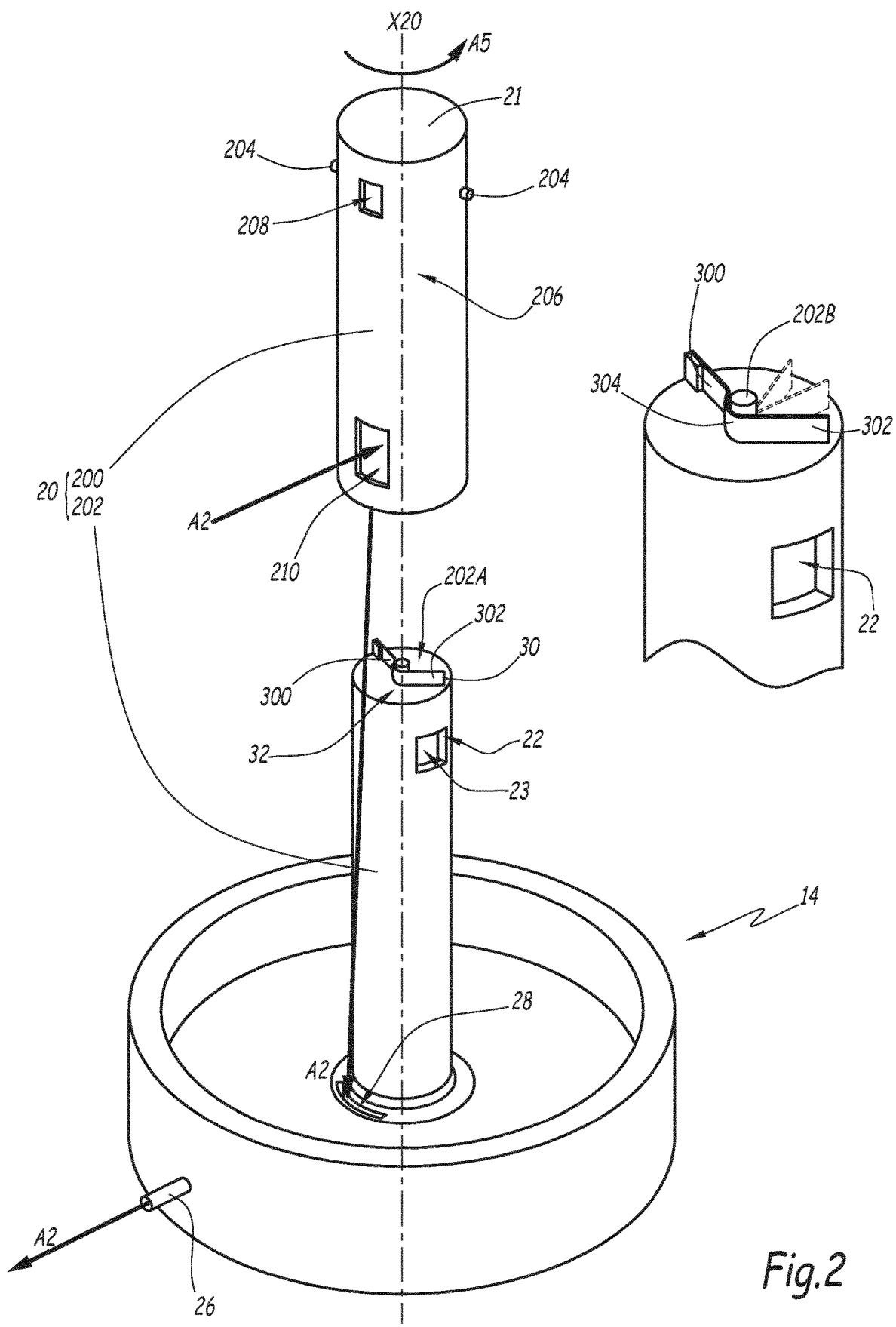
FIG. 2 is a schematic exploded view of the filter housing of FIG. 1 including a rotatable portion and a stationary portion of an axial member, in a first configuration.
Figure 9:
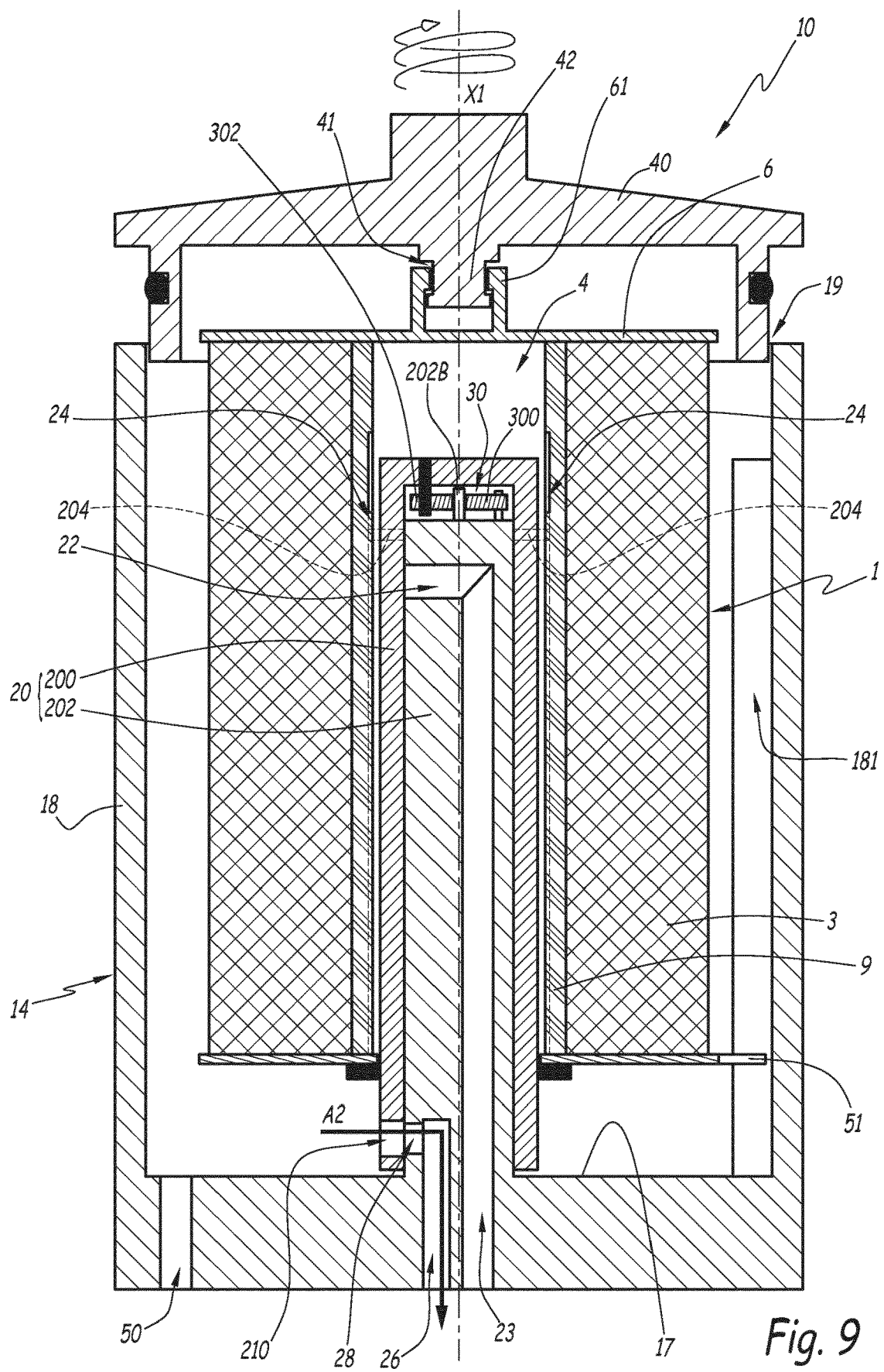
FIGS. 9 and 10 are sectional views of a liquid filtering device according to the invention in the first and second configurations.

In a first position of the filter element 1 with respect to the axial member 20, the rotatable portion 200 is positioned with respect to the stationary portion 202 so that the liquid outlet opening 22 is closed by the wall of the rotatable portion 200. This configuration, represented on FIGS. 2 and 9, is obtained when the filter element 1 is not inserted in the housing 14, or when the filter element 1 is partially inserted in the housing 14 and the nipples 204 are engaged in the helical path 24 but not at the end of the helical path 24. In the first position when the filter element 1 is just engaged around the rotatable portion 200, the nipples 204 are in a neutral position such as represented on FIGS. 4 and 5. The liquid outlet opening 22 is therefore closed, preventing liquid from flowing from the channel 4.

Figure 3:
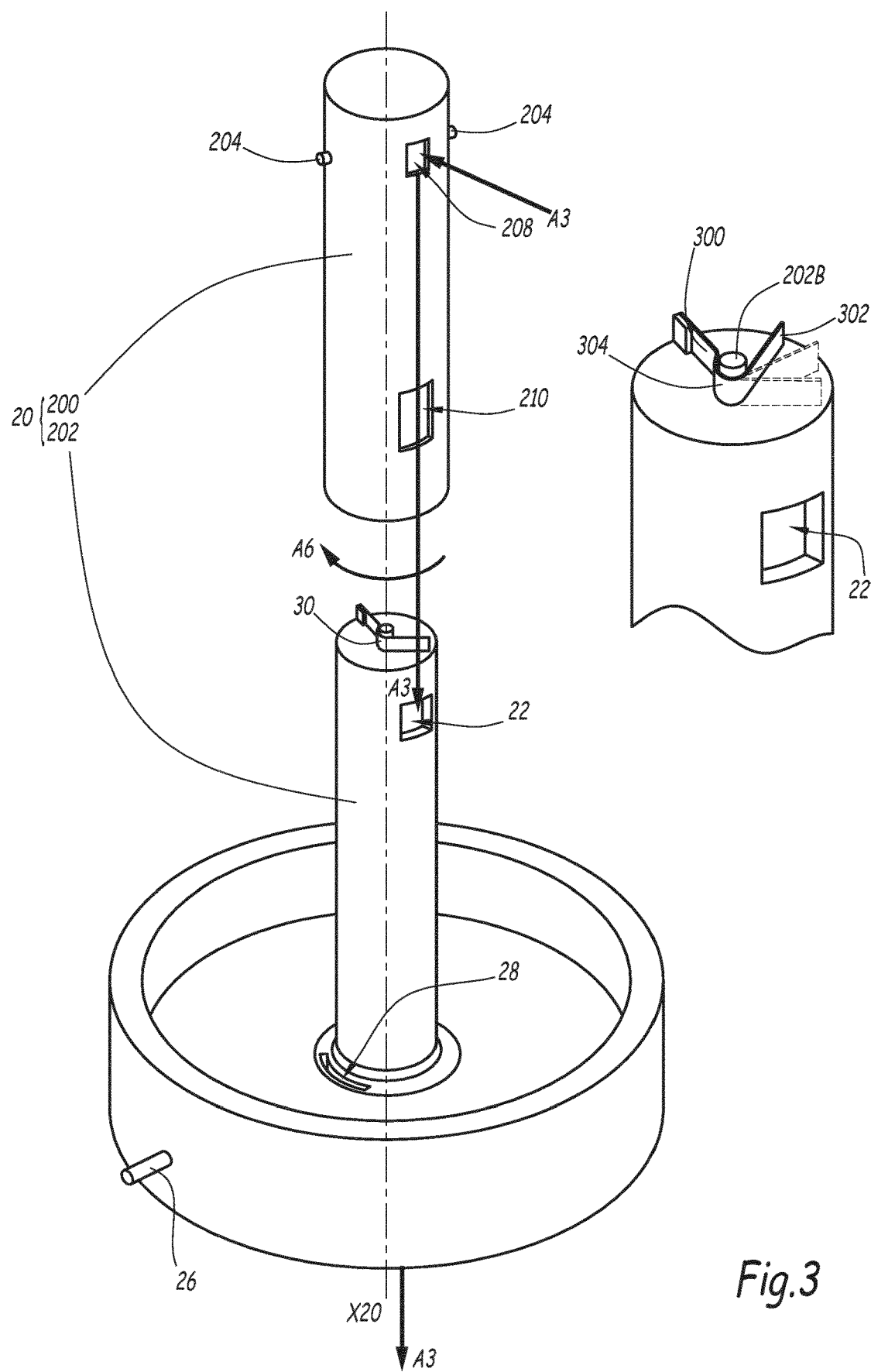
FIG. 3 is a schematic exploded view similar to FIG. 2, in a second configuration.
Figure 10:
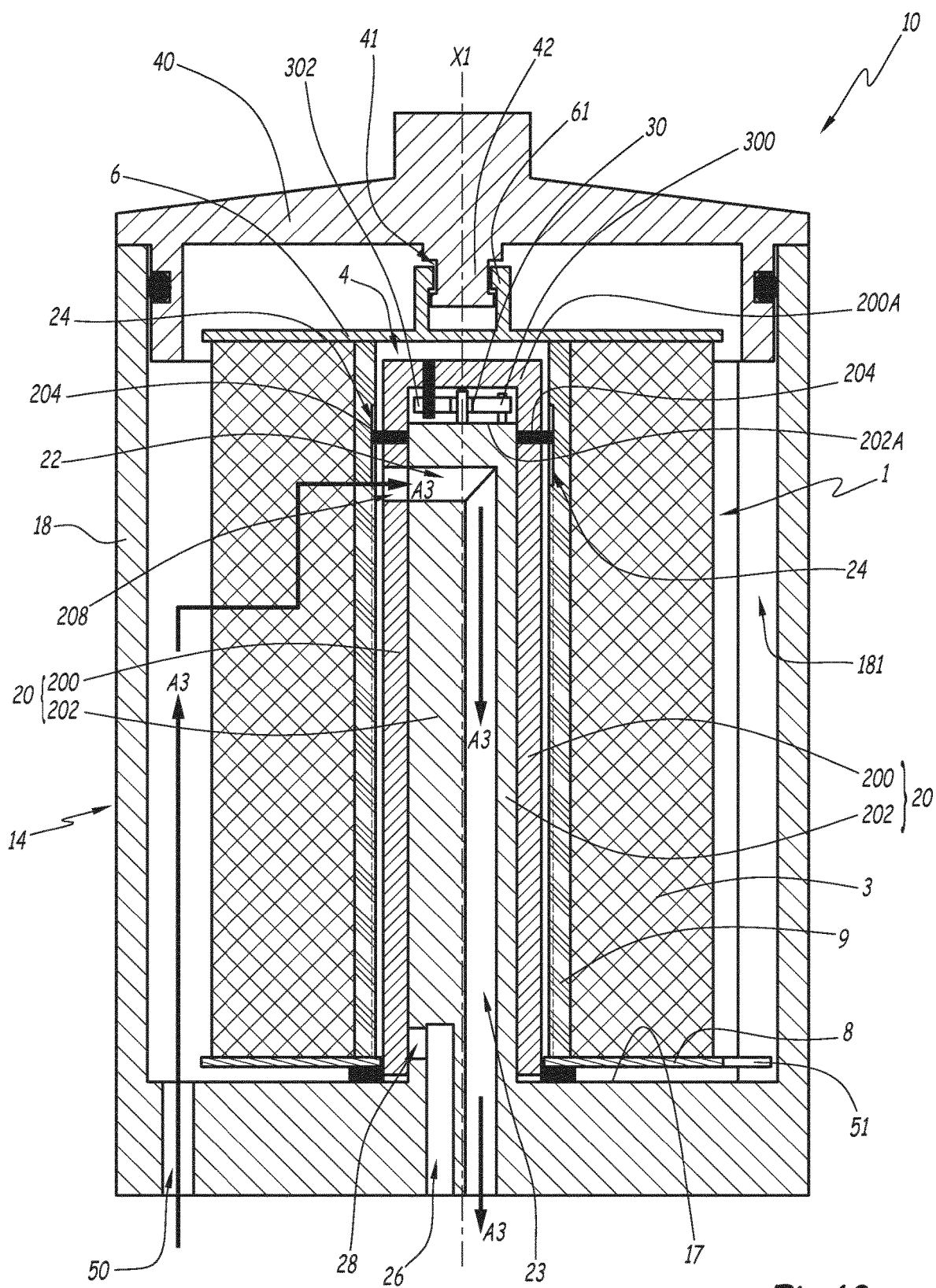

In a second position of the filter element 1 with respect to the axial member 20, the rotatable portion 200 is positioned with respect to the stationary portion 202 so that the liquid outlet opening 22 is open. In this configuration, the liquid outlet opening 22 and the first opening 208 are aligned, allowing liquid flow from the channel 4 to the liquid outlet opening 22. This configuration represented on FIGS. 3 and 10 is obtained when the filter element 1 has been further inserted in the housing 14, provoking rotation of the rotatable portion 200 around the axis X20 due to the cooperation of the nipples 24 with the helical path 24A. In an embodiment, the second position is obtained at an end 24A1 of the helical path 24A.

This allows protecting the opening 22 from exterior contamination during filter element replacement, as the opening 22 is closed in absence of a filter element 1 inserted in the housing 14. The opening 22 is only progressively open during the insertion of a new filter element 1, and preferably fully open only when the new filter element 1 is fully inserted.

For the purpose of the invention (starting and neutral position of the nipples 204 with respect to the path 24 when the filter element start to be engaged/Rotation of the rotating portion 200 can be caused by filter element only if filter element is not rotating with respect to the filter housing): the filter element 1 is advantageously attached to the filter cover 40 with a possibility of rotation between them via, for instance, clips 61 of the filter element cooperating with the annular groove 41 of the filter cover 40, and the filter element 1 is advantageously inserted in the filter housing without possibility of rotation of the filter element 1 with respect to the filter housing 14. To this aim the filter element 1 comprises anti-rotation device that cooperates with anti-rotation device formed in the filter housing. For instance, the anti-rotation device of the filter element 1 is formed by at least one finger 51 extending radially from the first end plate 5 that cooperates with at least one axial groove or rib 181 extending along the height of the peripheral wall 18.

According to an embodiment, the guiding path 24 is also adapted to generate, when the filter element 1 is dismounted from the filter housing 14 during a second translation movement along the central axis X1 in the opposite direction with respect to the first movement, a second rotational movement of the rotatable portion 200, in the opposite direction with respect to the progressive rotational movement, this second rotational movement occurring at the beginning of the second translation movement.

This second rotation of the rotatable portion 200 occurs when the filter element 1 is extracted from the housing 14 along the axis X1.

The housing 14 comprises the draining channel 26 and a liquid draining opening 28 in fluid communication with the draining channel 26, and the rotatable portion 200 comprises a second opening 210 adapted to align with the liquid draining opening 28 or to close the draining opening 28. Advantageously, at least part of the draining channel 26 extends axially inside the stationary portion 202 and the liquid draining opening 28 is opened on the peripheral surface of the stationary portion 202 (see FIGS. 9 and 10) When the second opening 210 is aligned with the draining opening 28, liquid can flow from the channel 4 towards the draining channel 26. When the second opening 210 is not aligned with the draining opening 28, the wall of the rotatable portion 200 closes the draining opening 28, preventing liquid flow towards the draining channel 26.

The draining channel 26 may be linked to a liquid tank, for example an oil tank or fuel tank, allows returning liquid to the tank when the filter element is removed, to prevent a liquid containing particulates or contaminants from going in the liquid outlet opening 22. This creates a draining path, that must be open during maintenance operation, and closed during normal operation of the liquid filtering device 10.

In the first position of the rotatable portion 200, the draining opening 28 is open, while in the second position of the rotatable portion 200, the draining opening 28 is closed. The opening and closing states of the liquid outlet opening 22 and the draining opening 28 are inverted.

In an embodiment shown on FIGS. 2 and 3, the liquid outlet opening 22 and the draining opening 28 are angularly shifted from each other. The first opening 208 and the second opening 210 of the rotatable portion 200 are angularly aligned. This permits that the liquid outlet opening 22 and the draining opening 28 cannot be open at the same time. One is closed while the second opens. The angular shift between the liquid outlet opening 22 and the draining opening 28 may be, for example, 90°.

According to an alternative embodiment shown on FIGS. 9 and 10, the same technical effect may be obtained with the liquid outlet opening 22 and the draining opening 28 being angularly aligned, while the first opening 208 and the second opening 210 of the rotatable portion 200 are angularly shifted from each other.

Figure 4:
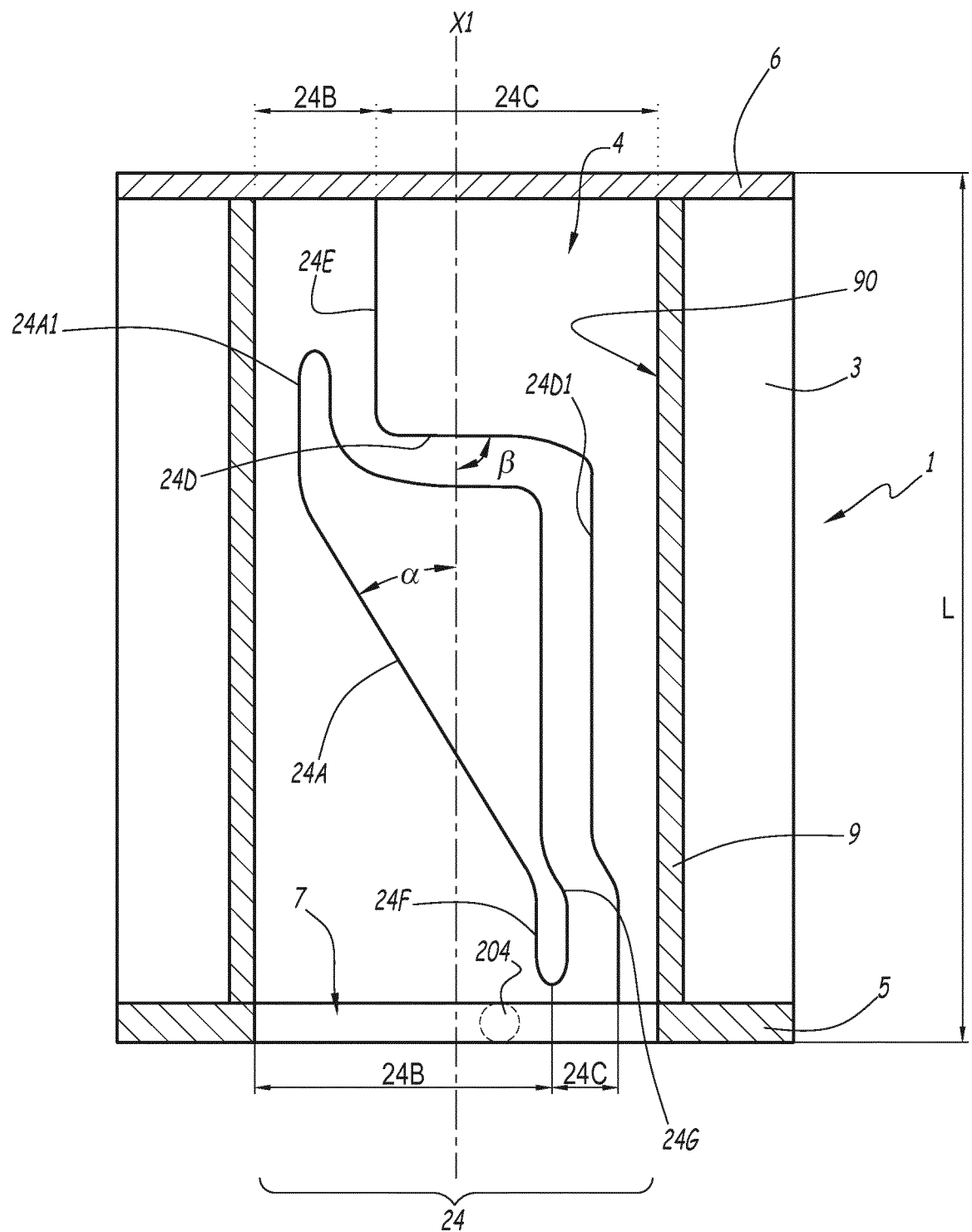
FIG. 4 shows a transversal sectional view of the filter element of FIG. 1.

While the rotation of the rotatable portion 200 is progressive during the insertion phase, the rotation of the rotatable portion 200 in the dismounting phase is advantageously faster than the rotation of the rotatable portion 200 during the insertion phase, thanks to a portion 24D of the path 24 that is different from the helical portion 24A of the path 24 (see FIG. 4). The second rotational movement occurs at the beginning of the second translation movement. The rotatable portion 200 must get back quickly to its first position, so that the liquid outlet opening 22 is closed as early as possible during the dismounting of the filter element 1, to prevent non-filtered liquid from entering the liquid outlet opening 22. Simultaneously, the quick opening of the draining opening 28 allows recovery of the non-filtered liquid.

The passage of the rotatable portion 200 from its second position to its first position at the beginning of the removal of the filter element 1 is advantageously obtained with a translation of the filter element 1 of up to 50% ° of the length L of the filter element taken along the axis X1. This value allows that the closing of the liquid outlet opening 22 and the opening of the draining opening 28 occur with a small displacement of the filter element 1 in the dismounting direction.

The housing 14 comprises a resilient means 30 urging the rotatable portion 200 in rotation around the central axis X20 with respect to the stationary portion 202 and maintaining the at least one protruding element 204 in contact with an active surface of the guiding path 24. This allows obtaining the passage of the rotatable portion 200 between its two positions with maximal velocity and reliability in the insertion phase and dismounting phase.

In an embodiment, the resilient means are formed by a spring 30 arranged in a space 32 extending axially between the rotatable portion 200 and the top of the stationary portion 202 and exerting a rotation torque on the rotatable portion 200. The spring 30 is mounted between an axial surface 202A of the stationary portion 202, and an axial inner surface 200A of the rotatable portion 200 (see FIGS. 8 and 9), opposed to the axial surface 202A.

The spring 30 comprises a first end 300 attached to the stationary portion 202, and a second end 302 attached to the rotatable portion 200. A central portion 304 is mounted around a central shaft 202B of the stationary portion 202.

The guiding path 24 comprises an insertion section 24B, which comprises the helical path 24A, and a dismounting section 24C, which comprises a portion 24D with an angle of inclination β that, when measured with respect to the central axis X1, is greater than the angle of inclination α of the helical path 24A. Preferably, the portion 24D of the dismounting portion 24C extends substantially perpendicular to the central axis X1 for generating the second rotational movement.

The guiding path 24 comprises a straight entry section 24F preceding the helical path 24A.

The helical path 24A comprises an end 24A1. When the nipples are in contact with the end 24A1, the rotatable portion 200 is in the second position.

The guiding path 24A comprises, after the end 24A1, a rest portion 24E provided between the insertion section 24B and the dismounting section 24C. When the nipples are in contact with the rest portion 24E, the rotatable portion 200 is in the second position.

The portion 24D extending perpendicular to the central axis X1 that is prolonged by a surface 24D1 parallel to the central axis X1 and shifted with respect to the rest portion 24E in the circumferential direction. The portion 24D and the surface 24D1 form a L general shape.

The rest portion 24E is shifted, on the inside periphery of the central perforated rigid tube 9 and in the circumferential direction, with respect to the end 24A1 of the helical path 24A.

The guiding path 24 comprises an exit section 24G which forms the end of the dismounting section 24C and which is, on the inside periphery of the central perforated rigid tube 9, shifted with respect to the entry section 24F.

The spring 30 exerts a torque that urges the nipples 204 in contact with the active surface of the helical path 24, said active surface being formed successively by the entry section 24F, the helical path 24A, the end 24A1, the rest portion 24E, the portion 24D, the surface 24D1, and the exit section 24D, depending on the axial position of the nipples 204, that varies with the axial position of the filter element 1.

Thanks to the spring 30 and the portion 24D, at the beginning of the removal of the filter element 1, the spring 30 urges the nipples 204 towards the surface 24D1, provoking the quick return of the rotatable portion 200 in the first position.

Figure 5:
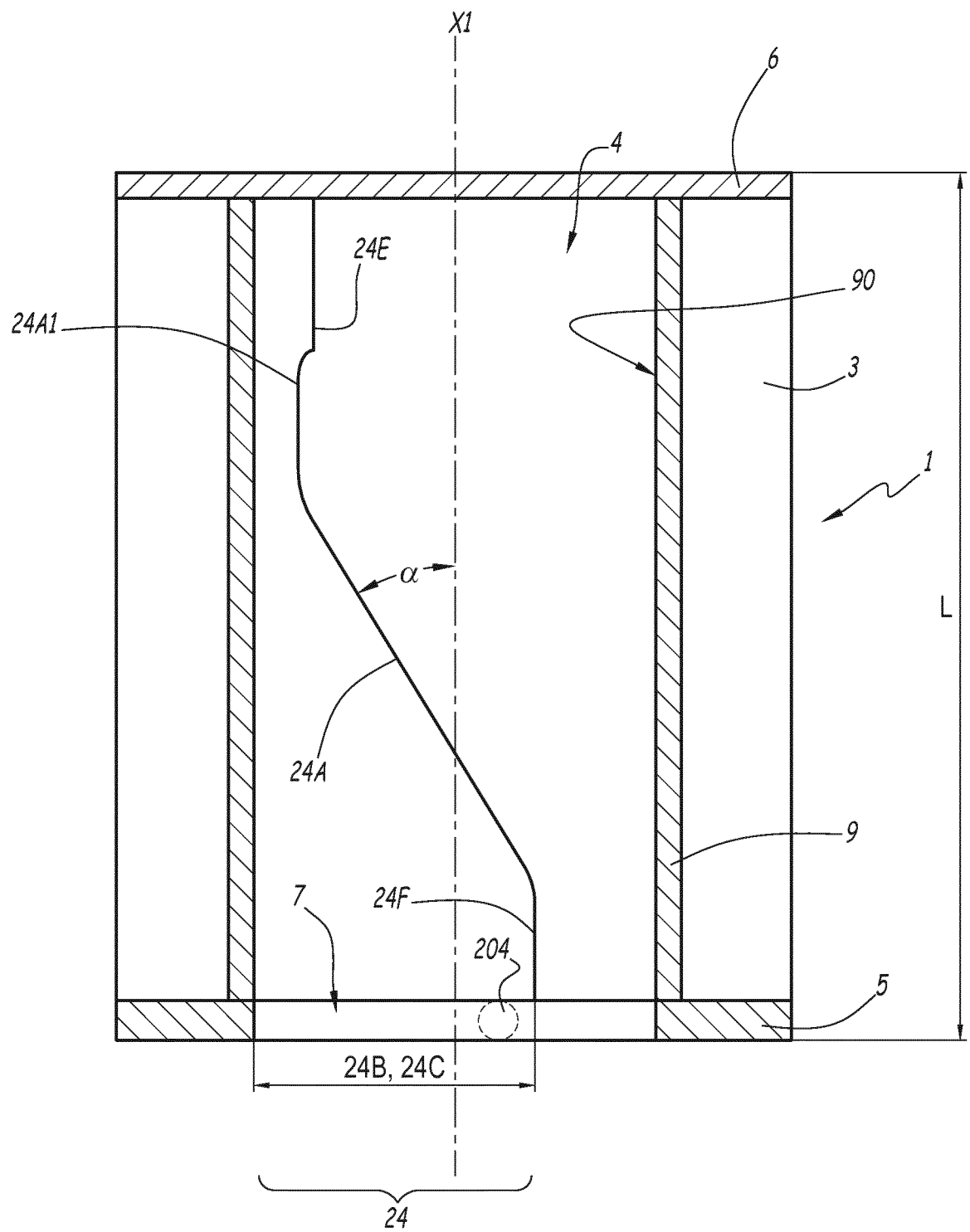
FIG. 5 is a view similar to FIG. 4 of a filter element according to an alternate embodiment.

In an alternate embodiment represented on FIG. 5, the guiding path 24 comprises an insertion section 24B that is the same as the dismounting section 24C. In this case, the nipples 204 have the same path in the insertion phase as in the dismounting phase. The guiding path 24 ends with the rest portion 24E. During dismounting of the filter element 1, the nipples 204 follow the helical path 24A in the inverse direction, meaning that the nipples 204 are not submitted to a quick turn as it is the case with the exit section 24D. In this case, the rotation of the rotatable portion 200 back to its first position is therefore progressive instead of being fast.

On FIGS. 9 and 10, a portion of the guiding path 24 is represented in dotted lines to highlight the fact that this portion is located in a plane that is angularly shifted with respect to the portion in continuous lines, relative to the central axis X1. Similarly, on FIG. 9 the nipples 204 are represented in dotted lines as they are angularly shifted with respect to the plane of the drawing.

Figure 6:
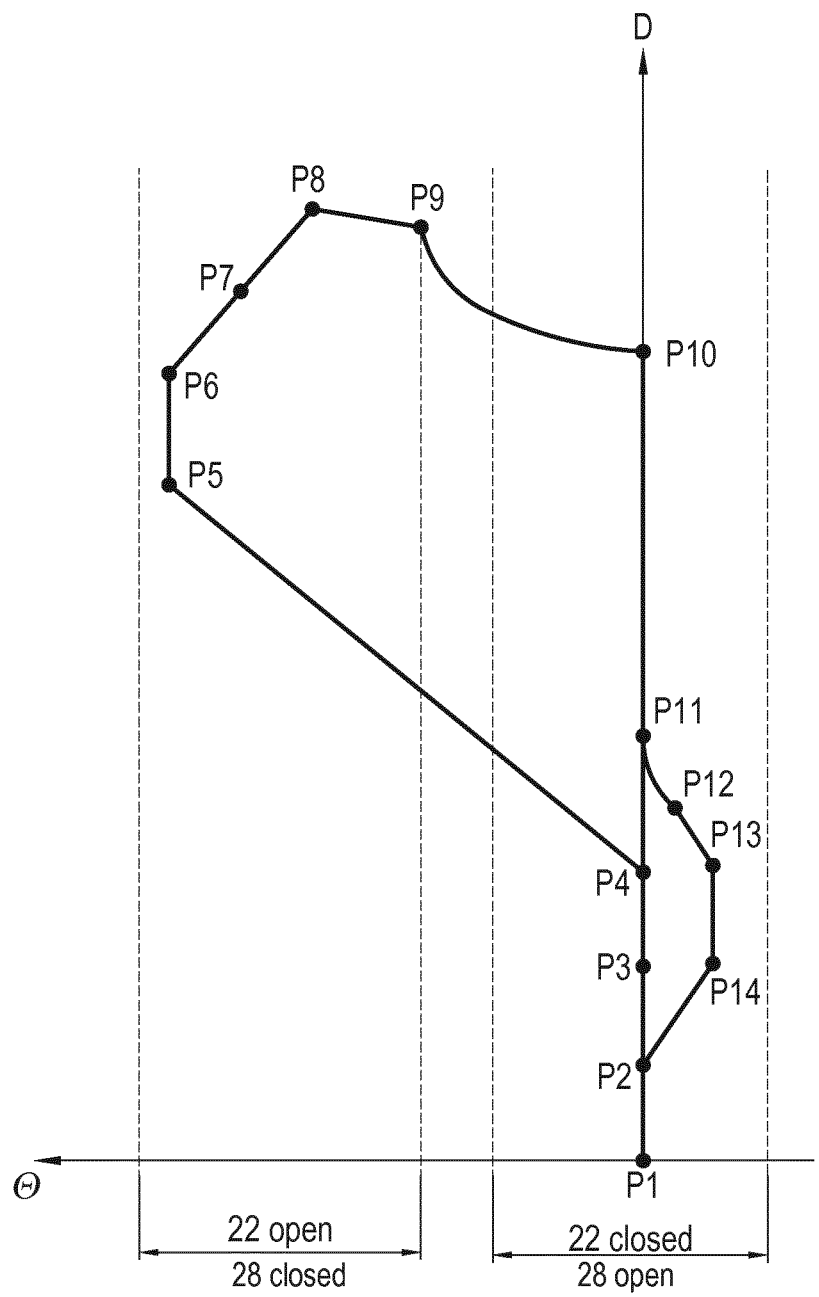
FIG. 6 is an angle versus displacement chart of the insertion and removal movements of the filter element with respect to the filter housing.

The operation of the liquid filtering device 10 will be described entirely with reference to FIG. 6 corresponding to the embodiment of FIG. 4 with a fast exit section 24D, which shows the angular position θ of the rotatable portion 200 and the axial displacement D of the filer element 1.

At point P1, the filter element 1 is remote from the axial member 20, and the nipples 204 do not cooperate with the guiding path 24.

At point P2, the insertion of the filter element 1 begins along arrow A1 on FIG. 1, with the nipples 204 not being in contact with the guiding path 24.

At point P3, the insertion has been continued, and nipples 204 now make contact with the guiding path 24.

At point P4, the insertion has been continued, and the nipples 204 now make contact with the helical path 24A. From point P1 to point P4, the angular position θ has not changed. During this phase, the rotatable portion 200 is kept in its first position, with the end 302 of the spring 30 being in a rest state showed on the right part of FIG. 2. In its rest state, the spring 30 is non-stressed, and does not produce an elastic force. During this phase, the liquid outlet opening 22 remains closed, and the draining opening 28 remains open, defining a draining path along arrow A2 on FIGS. 2 and 9.

Up to point P5, the filter element 1 has been pushed further, inducing a rotation of the rotatable portion 200, shown by arrow A5 on FIG. 2, caused by the nipples 204 that are pressed against the helical path 24A. The cooperation of the nipples 204 with the helical path 24A provokes a deformation of the spring 30, with the end 302 being in its position of the right of FIG. 3. The spring 30 now exerts a torque on the rotatable portion 200, that keeps the nipples 204 in contact with the helical path 24A. The liquid outlet opening 22 has been progressively open and the draining opening 28 has been progressively closed.

At point P5, the rotatable portion 200 is in its second position. The normal operation conditions of the filtering device 10 can take place. The path of the liquid is shown by arrows A3 on FIGS. 3 and 10. Non-filtered liquid enters the housing 14 via the liquid inlet channel 50. The liquid is filtered during its passage through the filter medium 3 and goes through the central tube 9 towards the channel 4. Filtered liquid can then flow from the channel 4 towards the liquid outlet opening 22, and then via the liquid outlet channel 23 outside of the liquid filtering device 10.

Through points P6 and P7 the insertion is continued, until the end 24A1 interrupts, and the nipples 204 are rapidly urged against the rest surface 24E by the spring 30. This corresponds to the point P8, in which the insertion of the filter element 1 in the filter housing 14 is maximal. The rotatable portion 200 remains in this angular position during normal operation of the liquid filtering device 10, with the liquid outlet opening 22 being open and the draining opening 28 being closed, which still corresponds to the second position of the rotatable portion 200.

At point P9, the dismounting phase initiates. The filter element 1 is pulled up along arrow A4 on FIG. 1, until the nipples 204 go out of the rest portion 24E, and are rapidly urged against the portion 24D, as shown by arrow A6 on FIG. 3. From point P9, the liquid outlet opening 22 start closing, while the draining opening 28 remains closed.

In a short axial displacement of the filter element 1, the nipples 204 make contact with the surface 24D1, at point P10. The rotatable portion 200 is thus back in its first position, with the liquid outlet opening 22 being closed and the draining opening 28 being open. The draining path along arrow A2 is therefore re-opened. The spring 30 is also back in its rest state.

Until point P11, the axial displacement of the filter element 1 goes on with no angular movement of the rotatable portion 200.

At point P12, the nipples 204 make contact with the exit section 24G. The exit section 24G is provided to bypass the entry section 24F. The rotatable portion 200 is therefore rotated by a small angle, at points P13 and P14 until the nipples 204 are not in contact anymore with the guiding path 24. The filter element 1 can therefore be extracted completely, while the rotatable portion 200 gets back to its initial position at point P2. From point P10 up to the position where the nipples 204 are no longer in contact with the guiding path 24, the liquid outlet opening 22 has remained closed and the draining opening 28 remained open.

The limited freedom to rotate of the rotatable portion 200 prevents undesired openings of the liquid outlet opening 22 that could allow entry of contaminants during filter element servicing.

Advantageously, the guiding path 24 is formed by a groove provided on an inner surface 90 of the central perforated rigid tube 9.

Preferably, the guiding path 24 is provided in two symmetric paths diametrically opposed with respect to the central axis X1, each symmetric path being in cooperation with one of the two nipples 204.

In an embodiment, the liquid outlet opening 22 and the draining opening 28 are axially shifted from each other. The liquid outlet opening 22 is located towards the free end 21, while the draining opening 28 is located close to the bottom wall 17. In an embodiment, the draining opening 28 is provided in the bottom wall 17.

In an embodiment, the first opening 208 and the second opening 210 of the rotatable portion 200 are axially shifted from each other. The axial shift may be equal to the axial shift of the liquid outlet opening 22 and the draining opening 28. In the example shown, the second opening 210 is close to the bottom wall 17 and in fluid communication with the draining opening 28 when the rotatable portion 200 is in its first position.

Figure 7:
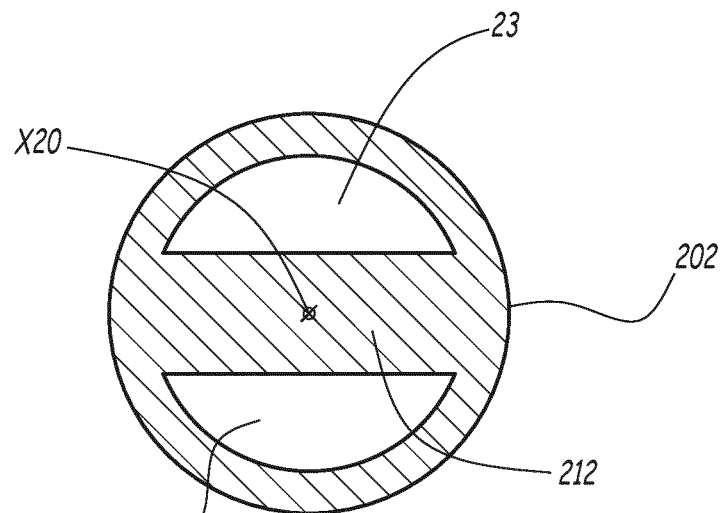
FIGS. 7 and 8 are transversal sectional views of the axial member according to two embodiments.

In an embodiment represented on FIG. 7, instead of being provided in the bottom wall 17, the draining opening 28 may be provided on the axial member 20, with the draining channel 26 being provided at least in part within the axial member 20. In such a case, the inner outlet channel 23 and the draining channel 26 are arranged parallel to the central axis X20 and opposed with respect to the central axis X20. A central planar wall 212 separates the draining channel 26 and the inner outlet channel 23.

Figure 8:
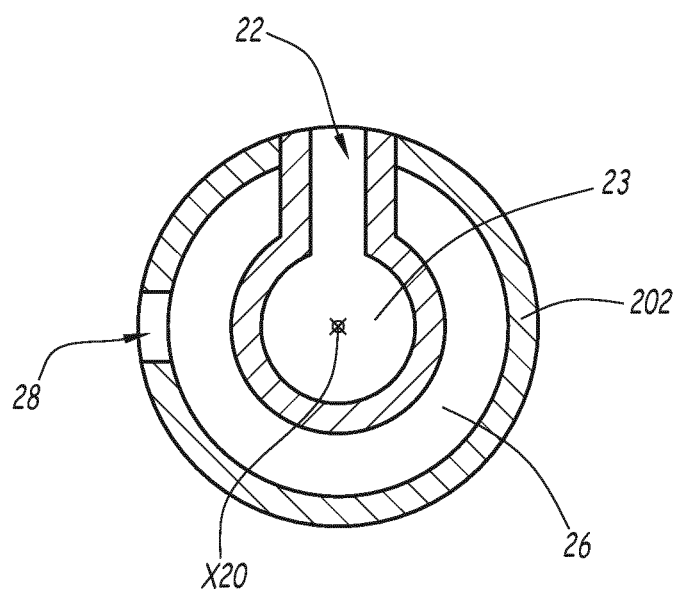

In an embodiment on FIG. 8, the inner outlet channel 23 and the draining channel 26 may be arranged concentrically around the central axis X20. For example, the inner outlet channel 23 may be located radially inside the draining channel 26. An inverted configuration may also be provided.

The invention claimed is:

1. A filter element comprising:
   a filter medium configured with an annular shape, having a central axis and forming inside a central channel extending substantially axially;
   first and second end plates, each plate covering and being sealingly mounted on one axial end of the filter medium, the first end plate having a central opening substantially coaxial with the central axis and in fluid communication with the channel;
   a central perforated rigid tube that extends axially between the first and second end plates and having an inner perforated wall delimiting the central channel the filter element being designed to be placed in a filter housing for forming a liquid filtering device, whereby a liquid to be filtered can flow along a liquid path through the filter medium ds the channel and out of the filter element through the central opening,
   wherein the filter element further comprises an anti-rotation device configured to cooperate with an anti-rotation device formed in the filter housing so as to prevent rotation of the filter element with respect to the filter housing when the filter element is inserted in the filter housing and during the entire installation process of the filter element into the filter housing, wherein
the central perforated rigid tube comprises at least one guiding path, arranged inside the central perforated rigid tube, adapted to generate, by contact with a following member of a rotatable central element of the filter housing, at least a first, progressive rotational movement of the rotatable element of the filter housing when the filter element is mounted in the filter housing during a first translation movement along the central axis:
said at least ne guiding path comprises at least one portion of a helical path for obtaining the first, progressive rotational movement, and the helical path extends on less than half of an inner periphery of the central perforated rigid tube in order to generate a rotation of the rotatable element inferior to one half of a turn,
wherein the guiding path is adapted to generate, when the filter element is dismounted from the filter housing during a second translation movement along the central axis in the opposite direction with respect to the first movement, a second rotational movement of the rotatable element, in the opposite direction with respect to the progressive rotational movement, this second rotational movement occurring at the beginning of the second translation movement, wherein the guiding path comprises an insertion section, which comprises the helical path, and a dismounting section, which comprises a portion with an angle of inclination that, when measured with respect to the central axis of the filter element, is greater than the angle of inclination of the helical path of the insertion section.

2. The filter element according to claim 1, wherein said helical path extends on less than a quarter of the inner periphery of the central perforated rigid tube in order to generate a rotation of the rotatable element inferior to one quarter of a turn.

3. The filter element according to claim 1, wherein said helical path has an inclination angle comprised between 5° and 45° with respect to the central axis of the filter element.

4. The filter element according to claim 1, wherein the guiding path comprises a rest portion provided between the insertion section and the dismounting section.

5. The filter element according to claim 4, wherein the portion extending substantially perpendicular to the central axis is prolonged by a surface parallel to the central axis and angularly shifted in a circumferential direction with respect to the rest portion, wherein the portion extending substantially perpendicular to the central axis and the surface parallel to the central axis form together a L general shape.

6. The filter element according to claim 4, wherein the rest portion is, on the inside periphery of the central perforated rigid tube, angularly shifted in a circumferential direction with respect to the end of the helical path.

7. The filter element according to claim 1, wherein the guiding path comprises a straight entry section preceding the helical path.

8. The filter element according to claim 7, wherein the guiding path comprises an exit section which forms the end of the dismounting section and which is, on the inside periphery of the central perforated rigid tube, angularly shifted in a circumferential direction with respect to the entry section.

9. The filter element according to claim 1, wherein the guiding path is formed by a groove provided on an inner surface of the central perforated rigid tube.

10. The filter element according to claim 1, wherein the guiding path is provided in two symmetric paths diametrically opposed with respect to the central axis.

11. A liquid filtering device comprising:
a filter element, comprising:
a filter medium configured with an annular shape, having a central axis and forming inside a central channel extending substantially axially;
first and second end plates, each plate covering one axial end of the filter medium and being sealingly mounted on said axial end, the first end plate having a central opening substantially coaxial with the central axis and in fluid communication with the channel;
a central perforated rigid tube that extends axially between the first and second end plates and having an inner perforated wall delimiting the central channel;
the liquid filtering device also comprising a filter housing receiving the filter element,
wherein
the central perforated rigid tube comprises at least one guiding path, arranged inside the central perforated rigid tube, adapted to generate, by contact with a following member of a rotatable element of the filter housing, at least a first, progressive rotational movement of the rotatable element of the filter housing when the filter element is mounted in the filter housing during a first translation movement along the central axis:
said at least one guiding path comprises at least one portion of a helical path for obtaining the first, progressive rotational movement;
said filter housing including a bottom wall, a peripheral wall, a main opening at its axial end opposite the bottom wall, and an axial member which is configured to be inserted in the filter element channel, the axial member forming an inner outlet channel, the axial member comprising at least one liquid outlet opening allowing liquid to flow from the channel of the filter element towards the inner outlet channel of the axial member,
a filter cover to which the filter element is attached, the filter element being attached to the filter cover with a possibility of rotation between them,
wherein the filter element comprises an anti-rotation device and the filter housing comprises an anti-rotation device, and wherein the filter element is inserted in the filter housing without possibility of rotation of the filter element with respect to the filter housing thanks to the anti-rotation device of the filter element that cooperates with the anti-rotation device formed in the filter housing,
wherein:
the axial member comprises a rotatable portion forming the rotatable element, and a stationary portion,
the stationary portion comprises the liquid outlet opening, and the rotatable portion comprises a first opening adapted to align with the liquid outlet opening, and adapted to close the liquid outlet opening,
the rotatable portion comprises at least one protruding element, forming the following member, adapted to be received in the guiding path of the filter element when the filter element is mounted in the filter housing,
in a first position of the filter element, the rotatable portion is positioned with respect to the stationary portion so that the liquid outlet opening is closed;
in a second position of the filter element, the rotatable portion is positioned with respect to the stationary portion so that the liquid outlet opening is open.

12. A liquid filtering device according to claim 11, wherein the filter housing comprises a draining channel and a liquid draining opening in fluid communication with the draining channel, and the rotatable portion comprises a second opening adapted to align with the liquid draining opening, and adapted to close the draining opening, and wherein: in the first position of the filter element, the draining opening is open, in the second position of the filter element, the draining opening is closed.

13. A liquid filtering device according to claim 12, wherein the liquid outlet opening and the draining opening are axially shifted from each other.

14. A liquid filtering device according to claim 12, wherein the first and second openings of the rotatable portion are axially shifted from each other.

15. A liquid filtering device according to claim 12, wherein the liquid outlet opening and the draining opening are angularly shifted from each other.

16. A liquid filtering device according to claim 12, wherein the first and second openings of the rotatable portion are angularly aligned.

17. A liquid filtering device according to claim 12, wherein the first and second openings of the rotatable portion are angularly shifted from each other, and wherein the liquid outlet opening and the draining opening are angularly aligned.

18. A liquid filtering device according to claim 12, wherein the draining opening is provided in the bottom wall.

19. A liquid filtering device according to claim 12, wherein the draining channel is provided within the axial member, and the inner outlet channel and the draining channel are arranged concentrically around the central axis of the axial member.

20. A liquid filtering device according to claim 12, wherein the draining channel is provided within the axial member, and the inner outlet channel and the draining channel are arranged parallel to the central axis of the axial member and opposed with respect to the central axis of the axial member.

21. A liquid filtering device according to claim 11, wherein the filter housing comprises a resilient means urging the rotatable portion in rotation around the central axis of the axial member with respect to the stationary portion and maintaining the at least one protruding element in contact with an active surface of the guiding path of the filter element.

22. A liquid filtering device according to claim 21, wherein at the beginning of the removal of the filter element, the resilient means urges the rotatable portion towards the first position.

23. A liquid filtering device according to claim 22, wherein the passage of the rotatable portion from its second position to its first position at the beginning of the removal of the filter element is obtained with a translation of the filter element of up to 50% of the length of the filter element taken along its central axis.

24. A liquid filtering device according to claim 23, wherein the resilient means are formed by a spring arranged in a space between the rotatable portion and the stationary portion and exerting a rotation torque on the rotatable portion.

25. A liquid filtering device according to claim 11, wherein the at least one protruding element is formed by two nipples radially protruding from an outer cylindrical surface of the rotatable portion.

26. A liquid filtering device according to claim 11, wherein
the helical path extends on less than half of the inner periphery of the central perforated rigid tube in order to generate a rotation of the rotatable element inferior to one half of a turn.

27. A liquid filtering device according to claim 11, wherein the liquid outlet opening is a radial opening.

28. A liquid filtering device according to claim 11, wherein the first opening is a radial opening.

29. A liquid filtering device according to claim 11, wherein in the first position of the filter element, the filter element is removed from the filter housing, while in the second position of the filter element, the filter element is completely inserted in the filter housing.

30. A liquid filtering device according to claim 11, wherein the anti-rotation device of the filter element is formed by at least one finger extending radially from the first end plate that cooperates with the anti-rotation device of the filter housing comprising at least one axial groove or rib extending along the height of the peripheral wall.

31. A vehicle comprising a liquid filtering device according to claim 11.

32. The filter element according to claim 1, wherein said portion of the dismounting section extends substantially perpendicular to the central axis for generating the second rotational movement.

33. A filter element comprising:
a filter medium configured with an annular shape, having a central axis and forming inside a central channel extending substantially axially;
first and second end plates, each plate covering and being sealingly mounted on one axial end of the filter medium, the first end plate having a central opening substantially coaxial with the central axis and in fluid communication with the channel;
a central perforated rigid tube that extends axially between the first and second end plates and having an inner perforated wall delimiting the central channel the filter element being designed to be placed in a filter housing for forming a liquid filtering device, whereby a liquid to be filtered can flow along a liquid path through the filter medium towards the channel and out of the filter element through the central opening,
wherein:
the central perforated rigid tube comprises at least one guiding path, arranged inside the central perforated rigid tube, adapted to generate, by contact with a following member of a rotatable central element of the filter housing, at least a first, progressive rotational movement of the rotatable element of the filter housing when the filter element is mounted in the filter housing during a first translation movement along the central axis:
said at least one guiding path comprises at least one portion of a helical path for obtaining the first, progressive rotational movement, and the helical path extends on less than half of the inner periphery of the central perforated rigid tube in order to generate a rotation of the rotatable element inferior to one half of a turn
wherein the guiding path is adapted to generate, when the filter element is dismounted from e filter housing during a second translation movement along the central axis in the opposite direction with respect to the first movement, a second rotational movement of the rotatable element, in the opposite direction with respect to the progressive rotational movement, this second rotational movement occurring at the beginning of the second translation movement, wherein the guiding path comprises an insertion section, which comprises the helical path, and a dismounting section, which comprises a portion with an angle of inclination that, when measured with respect to the central axis of the filter element, is greater than the angle of inclination of the helical path of the insertion section.

34. A liquid filtering device comprising:

a filter element, comprising:

a filter medium configured with an annular shape, having a central axis and forming inside a central channel extending substantially axially;

first and second end plates, each plate covering one axial end of the filter medium and being sealingly mounted on said axial end, the first end plate having a central opening substantially coaxial with the central axis and in fluid communication with the channel;

a central perforated rigid tube that extends axially between the first and second end plates and having an inner perforated wall delimiting the central channel;

the liquid filtering device further comprising a filter housing receiving the filter element, wherein the central perforated rigid tube comprises at least one guiding path, arranged inside the central perforated rigid tube, adapted to generate, by contact with a following member of a rotatable element of the filter housing, at least a first, progressive rotational movement of the rotatable element of the filter housing when the filter element is mounted in the filter housing during a first translation movement along the central axis:

said at least one guiding path comprises at least one portion of a helical path for obtaining the first, progressive rotational movement;

said filter housing including a bottom wall, a peripheral wall, a main opening at its axial end opposite the bottom wall, and an axial member which is configured to be inserted in the filter element channel, the axial member forming an inner outlet channel, the axial member comprising at least one liquid outlet opening allowing liquid to flow from the channel of the filter element towards the inner outlet channel of the axial member, wherein:

the axial member comprises a rotatable portion forming the rotatable element, and a stationary portion, the stationary portion comprises the liquid outlet opening, and the rotatable portion comprises a first opening adapted to align with the liquid outlet opening, and adapted to close the liquid outlet opening, the rotatable portion comprises at least one protruding element, forming the following member, adapted to be received in the guiding path of the filter element when the filter element is mounted in the filter housing, in a first position of the filter element, the rotatable portion is positioned with respect to the stationary portion so that the liquid outlet opening is closed;

in a second position of the filter element, the rotatable portion is positioned with respect to the stationary portion so that the liquid outlet opening is open, wherein the filter housing comprises a draining channel and a liquid draining opening in fluid communication with the draining channel, and the rotatable portion comprises a second opening adapted to align with the liquid draining opening, and adapted to close the draining opening, and wherein:

in the first position of the filter element, the draining opening is open, in the second position of the filter element, the draining opening is closed.

* * * * *